Nov. 11, 1969     R. L. WERNER ET AL     3,477,120
METHOD OF MAKING LADDER JOINT
Filed Aug. 9, 1966     5 Sheets-Sheet 5

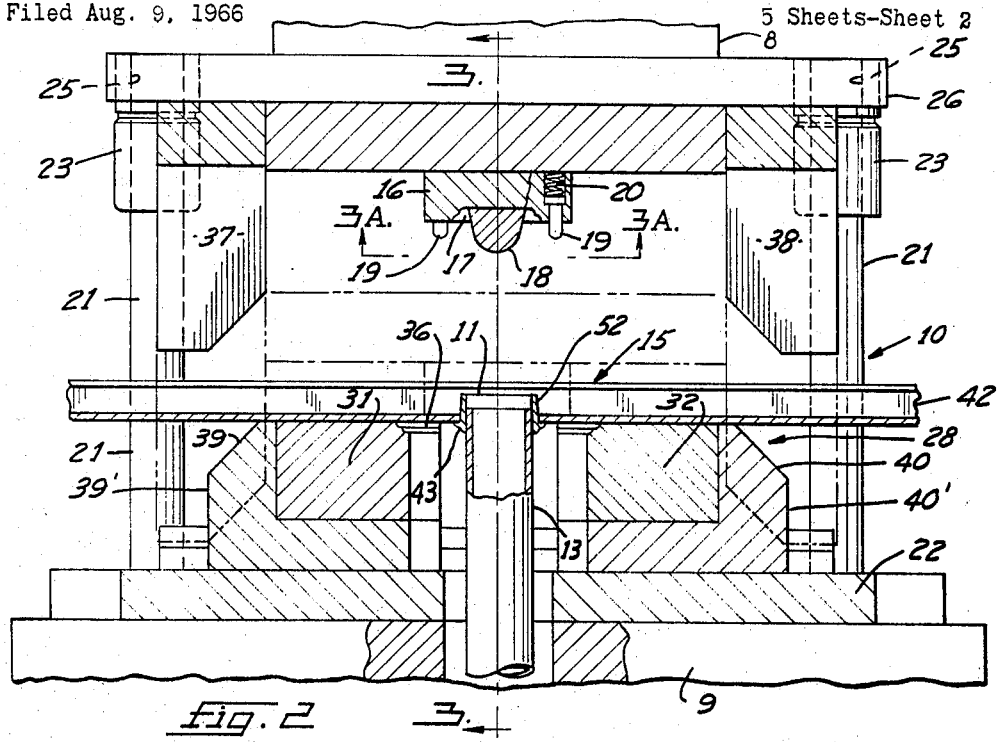
Fig. 2
Fig. 3A
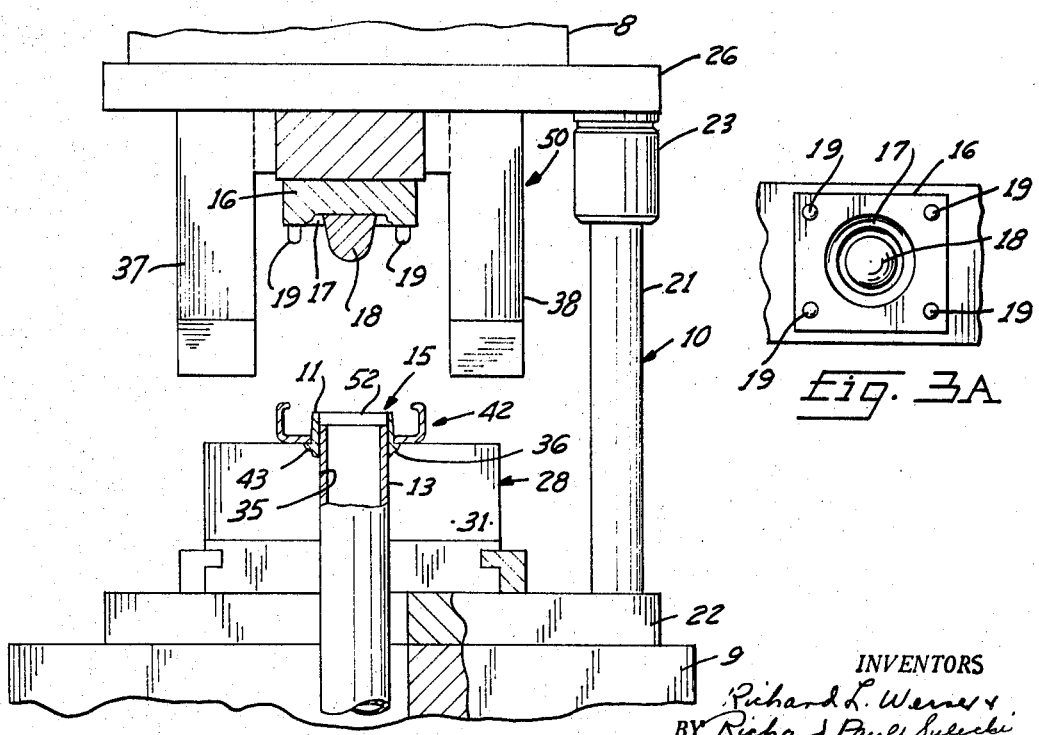
Fig. 3
INVENTORS
Richard L. Werner
BY Richard Paul Sulecki
ATTORNEY

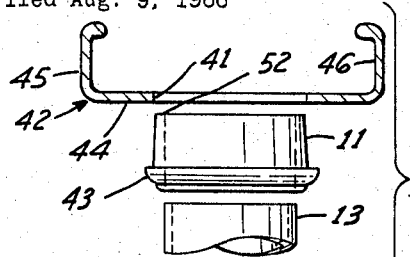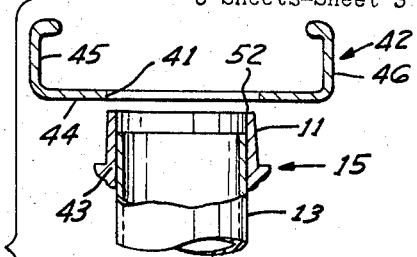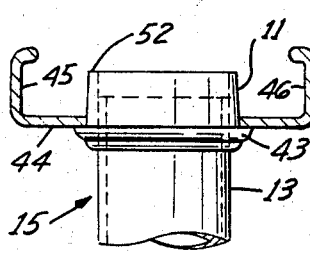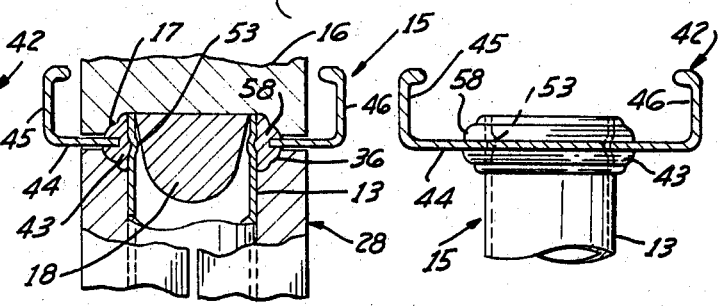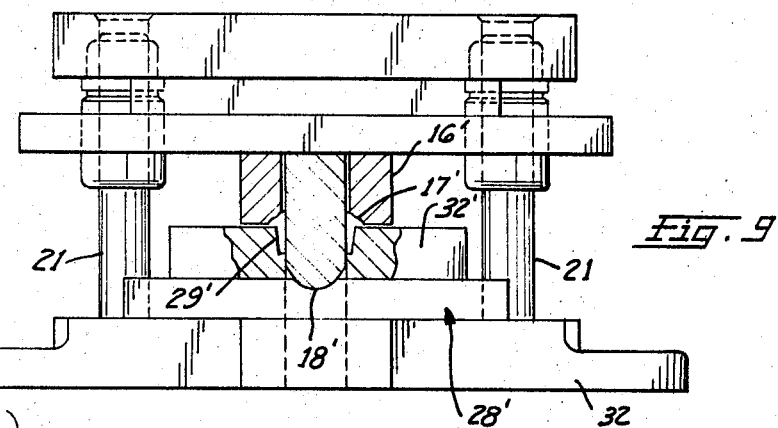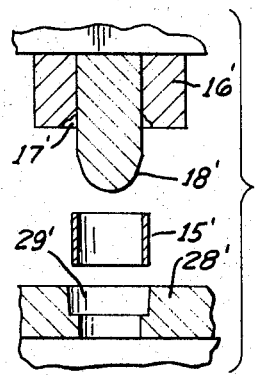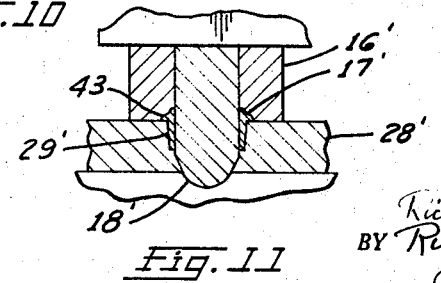

INVENTORS
Richard L. Werner
BY Richard Paul Sulecki

ATTORNEY

United States Patent Office 3,477,120
Patented Nov. 11, 1969

3,477,120
METHOD OF MAKING LADDER JOINT
Richard L. Werner, Sharon, and Richard Paul Sulecki,
Transfer, Pa., assignors to R. D. Werner Co., Inc.,
Greenville, Pa., a corporation of Pennsylvania
Filed Aug. 9, 1966, Ser. No. 571,249
Int. Cl. B21d *39/00;* B23p *11/00*
U.S. Cl. 29—509                               13 Claims

ABSTRACT OF THE DISCLOSURE

This application discloses a method of making a secure stress and strain resistant ladder joint between a rung part and rail part by utilizing a preflanged ferrule therebetween.

---

This invention relates to a ladder construction and particularly to an improved metal ladder construction. The invention particularly pertains to the field of joining ladder rungs and side rails where such parts are of a metal which may be extruded or swaged, such as aluminum and its alloys.

The invention represents improvements for assembling and unitizing the joining of a rung and side rail with respect to each other.

This invention represents improvements in the making of stress and strain-resistant ladders of the type shown in U.S. Letters Patent No. 3,039,186 dated June 19, 1962, owned by the assignee of the present application.

In use, a rung type ladder is subjected to a variety of complex stresses. In addition to the obvious stress, bending of the rungs, under the load of the person standing on the ladder, there are certain unappreciated stresses such as those tending to rotate the rungs about their longitudinal axis and also other forces which tend to twist the ladder about its longitudinal axis, that is, an axis taken along the length of the ladder.

All of these stresses must, of course, be successfully resisted or else the ladder will distort, and become, in doing so, unsafe for use.

In the joint construction of prior art ladders according to U.S. Letters Patent No. 3,039,186, three parts or members were employed, viz. a ferrule, banding element, or sleeve part or member; the lengthwise extending cross-rung member, a suitable side rail. The machine or assembly for joining said parts consists of a pair of opposed dies exerting opposed compressive force on the ends of the ferrules lengthwise to compress the ferrule, to cause the ferrule metal to flow radially-outwardly into tight engagement with and in side rimming flow along both sides of an associated wall edge portion of an opening in the side rail.

In addition, by means of such machine and assembly, ferrule metal is caused to flow slightly radially inwardly in a compression-grooving action into the wall and/or upon the outer surface of the end portion of the rung to provide a groove or valley therein; this in-movement provides a secure aligned-interlatched or interlocked arrangement between an intermediate portion of the ferrule metal and an end portion of the rung member. End-force application on the ferrule is sufficient to produce a major flow of metal radially outwardly in a side-rail-expanding manner between the rung and the side rail.

Thus in the prior art construction referred to herein a secure stress-and-strain-resistant ladder joint is provided between the rung parts and associated rail parts of a ladder.

The present invention contemplates an improved method for securing the three parts or members of the joint assembly together.

In the prior art patent referred to, each ferrule or banding part is first disposed upon a rung end portion before insertion into a side rail opening. In the present invention, the ferrule may be provided with a flange, as described above, on one end before disposing the ferrule on the rung. The use of such flange provides improved control or collapse of the unformed side of the ferrule during forming and, hence, reduces the need for precise adjustment of swaging machine control during the joint formation; the machine cycle can be shortened; punch press tooling of the assembly of the rung to the rail may be used instead of special hydraulic machinery, such as shown in prior art Letters Patent No. 3,039,186, and, hence, a more economical operation secured. Furthermore, either one or both ends of the rungs can be attached to the side rails simultaneously.

Further, the improved method of construction of this invention eliminates stress risers and rung failures.

Objects of the present invention are to provide an improved method for forming the ferrule part of the joint assembly, an improved method of assembly of the ferrule and the rung and an improved method of providing a joint connection of a ladder rail, ferrule and rung construction.

Another object of the invention is to provide an improved method of making a joint between the rail and rung of a ladder, which joint is adapted to resist the stresses and strains and twisting and torque to which these parts are exposed.

A further object of the invention is to provide an improved method for assembling ladder parts whereby economies of operation and increased efficiency results.

Other objects of my invention and the invention itself will become more readily apparent by reference to the foregoing description and claims and the accompanying drawings, in which drawings:

FIGURE 1 is an isometric view of a vertical press used in the manufacture of a ladder according to the present invention, showing a portion of a channel shaped rail of the ladder, openings therein, a ferrule and rung assembly inserted vertically through one of said openings in said rail and illustrating its position prior to final forming and another ferrule and rung assembly inserted through one of the openings in the rail and being joined thereby;

FIGURE 2 is a sectional enlarged view of parts of the press of FIGURE 1 showing the rung and ferrule assembly disposed in an opening in the rail of the ladder prior to a final joint forming step;

FIGURE 3 is a view taken from the line 3—3 of FIGURE 2;

FIGURE 3A is a view taken from the line 3A—3A of FIGURE 2;

FIGURES 4, 5, 6, 7 and 8 are views illustrating sequential steps employed in the assembly of the ladder rail, ferrule and rung joint according to the invention, the ferrule disclosed therein having been provided with a flange on one end prior to its placement upon the rung and the rung and assembled ferrule insertion within the rail opening;

In particular, FIGURE 4 is an exploded view disclosing the separate ladder rail, ferrule and rung parts prior to assembly.

Figure 1:
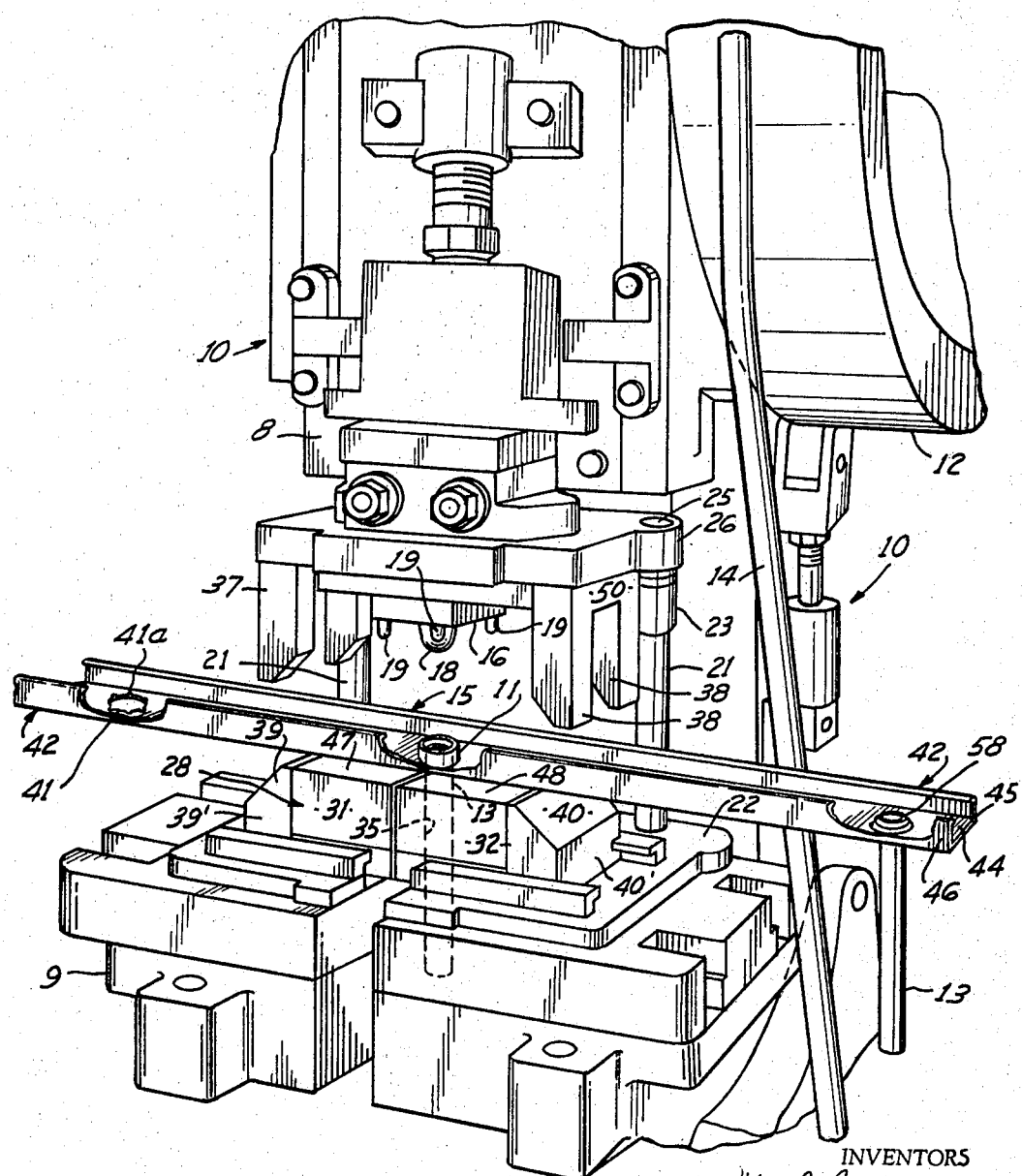
Figure 12:
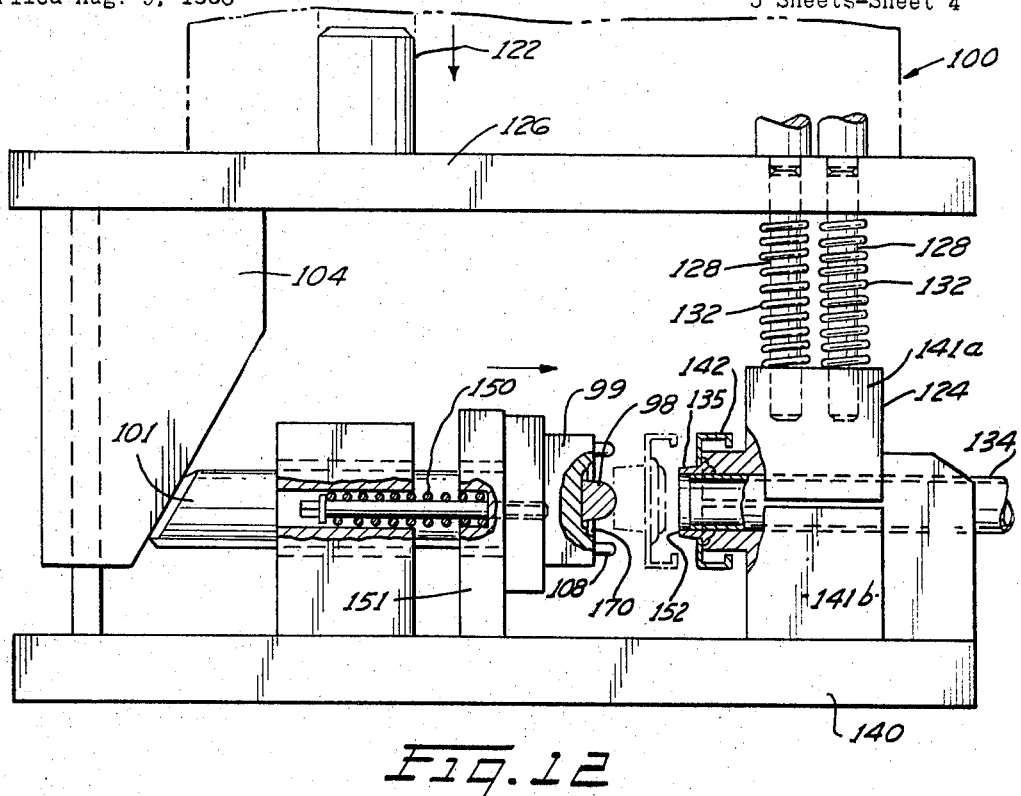

FIGURE 5 is an exploded view partly in section showing the ferrule of FIGURE 4 in partial telescoped engagement with the one end of the rung;

FIGURE 6 shows the ferrule assembled rung of FIGURE 5 disposed within an opening in a wall of the ladder rail of FIGURES 4 and 5;

FIGURE 7 is a sectional view illustrating portions of the press of FIGURE 1 and the ferrule, rung and associated rail parts;

FIGURE 8 illustrates the rung and rail connection joint formed by the press as shown in FIGURE 7 and omitting the press parts;

FIGURES 9, 10 and 11 are partial sectional views disclosing the forming of an end flange on a ferrule for use in the joint asseembly according to the invention;

FIGURE 10, it will be noted, is a sectional view showing the female and male members of a conventional punch die press, a standard straight ferrule being adapted to be coined in the die as shown in FIGURES 9 and 11;

FIGURE 12 is a longitudinal view, partially in section, of a horizontally disposed press adapted to secure a ferrule and rung assembly to a ladder rail; longitudinal withdrawal of the rail and rung assembly from the press to permit vertical sifting of the upper die during the sequence of operations being shown in phantom;

FIGURES 13, 14, 15, 16, and 17, disclose an alternate method of providing the ferrule with a flange on one end by forming the same on the ferrule when applying the ferrule to the rung, the ferrule being over-hung on the rung and formed thereon for subsequent jointure with a ladder rail, the views are mainly sectional with the pilot pin being shown in plan view.

Referring now to the drawings in all of which like parts are designated by like reference characters, in FIGURES 1–3A, is disclosed a conventional punch press of the so-called "vertical" type for assembling the improved joint construction of this invention which is formed by a ferrule, rung member and suitable side rails. In FIGURE 12 is disclosed die parts to be employed in a horizontal type punch press for assembling the parts of the improved joint construction of the invention. The vertical press is designated at 10 in FIGURES 1–3A and the horizontal type press at 100 in FIGURE 12. The press is adapted to be used in the fabrication of ladders, preferably manufactured of aluminum, magnesium, reinforced fiberglass and the like employing preferably ferrules of the same material to join the rungs and rails of such ladders together. The ferrules employed in the joint construction are preferably partially preformed with a flange on one end before placement in the press. Preferably, the ferrule is adapted to be assembled on the rung with a portion thereof overhanging an end of the rung prior to its insertion within an opening in the side rail of the ladder. As an alternate, the ferrule may be assembled on the rung without a portion thereof overhanging an end of the rung prior to its insertion within an opening in the side rail of the ladder.

In each of the presses shown, the male die member is provided with a pilot pin which is adapted to enter a tubular rung of a ladder aligned therewith and retained by a separate die member and the pilot pin is adapted to back-up an outer end of the rung during compression and forming of the ferrule and during the joint forming operation.

In FIGURES 4, 5, 6, 7 and 8, sequential steps in the opeartion of the joint assembly are shown; FIGURES 9 to 11 inclusive disclose a method of preforming a flange 43 on one end of the ferrule prior to its assembly with the rung; FIGURES 13 to 18 inclusive disclose simultaneous application of a straight ferrule to a rung and forming of a flange on one end of the ferrule 43. Hence, it can be seen that the ferrule may be preformed as in a punch press die and then affixed to the rung for final swedging or preformed directly onto the rung in the overhung position shown.

Referring now more particularly to the figures of drawings, it will be noted that in FIGURE 1 the vertical type press is generally designated by reference character 10 and is provided with a conventional inertia wheel 12 driven by a belt 14 from a suitable power source (not shown). The press includes an upper solid pilot die member 16, shown in greater detail in FIGURES 2, 3 and 3A, having a stepped forming end cavity 17 centrally located therein, a pilot pin 18 projecting downwardly from the cavity 17 and a plurality of spaced spring-pressed guide pins 19 being provided adjacent the corners of the die 16 and radially outwardly of the pilot pin and the stepped end cavity, the spring means for said guide pins being shown at 20. The pilot die 16 is affixed to a ram 8 of the punch press 10 and is moved downwardly toward an aligned split die member 28 mounted on the press bed 9, said die member 28 dripping a ferrule, rung and rail assembly 15, the rung being disposed vertically through inner bore segments or portions 35 of the die portions 31, 32; the pilot pin 18 enters the bore of the rung 13.

It is to be noted that the portions 31, 32 provide an end cavity 36 which conforms in contour to the opposed stepped end cavity 17 in the solid die 16 and conforms in contour to a flange preformed on one end of the ferrule prior to its positioning in an opening, such as shown at 41 in a side rail 42 for the ladder.

As shown, the side rails are generally but not limited to channel-shaped and comprise a web 44 and upstanding flanges 45, 46. The openings 41 are disposed at spaced intervals along the web of the rails. The opening 31 disclosed is preferably but not essentially provided with, as shown, circumferentially or peripherally spaced apart notches 41a, as related in the Stoyer Patent No. 3,039,186 previously referred to herein. The split die members 31, 32 are actuated upon downward movement of the ram 8 by cam members 37—37, 38—38 carried by the upper die shoe and said cam members are adapted, during downward movement of the upper die, to contact cam follower surfaces 39, 40 provided on die blocks 39', 40'. The reciprocal movement of the upper die member 16 is guided by guide members 21 secured to the split die mounting 22 and slidably journalled in bushings 23 projecting through openings 25 in the upper die mounting 26. The die members 31, 32 are adapted to grip and center the ferrule and rung assembly, as more fully described hereinafter, and the web of the side rail is adapted to be seated upon flat work surfaces 47, 48 of the die members 31 and 32, respectively.

It is to be noted that the cam members 37—37, 38—38 are provided on generally yoke-shaped members 50 and the spacing between the legs of the yoke having the cam surfaces thereon is sufficient to accommodate the placement of the rail therebetween. The assembled ferrule and rung is securely held by the split die member 28 during the down stroke and in alignment with the pilot pin 18, wherefore the pilot pin 18 is caused to enter the bore of the tubular rung 13 and due to its formation and dimensioning, as shown, enters the bore with a progressive swaging action into engagement within the inner diameter of the end of the rung member 13 and immediately beneath the ferrule 11, as hereinafter more fully described; the spring-loaded pilot pins 19 are adapted to locate the pin 18 and exert pressure during such swaging action upon spaced rail portions surrounding the opening 41 in the rail 42 through which the ferrule end of the rung projects.

When the die 16 reaches its lowermost position, the die cavity 17 receives an end 52 of the ferrule forming a flange 58 which corresponds in contour to the flange 43 preformed on said ferrule. Hence, opposite faces of the rail wall portions 42 surrounding the rail rung openings 41 are clamped between similar flanges 43 and 58, as shown in FIGURES 4 to 8 inclusive. When the punch or solid die member 16 is applied to the end 52 of the ferrule and surrounds the same, pressure applied by the die 16 causes the ferrule metal to flow into the cavity 17 and the ferrule is endwise inwardly and outwardly compressed to cause a flow of ferrule metal radially outwardly into compression engagement within and in side-rimming flow along a side of the wall portions of the openings 41 in the side rail 42.

In addition, ferrule metal flows slightly radially inwardly in a compression grooving action into the wall or upon the outer surface of the end portion of the rung 13 to provide a groove or valley 53. This inward collapse of the rung and ferrule also expands during forming and where the rail openings 41 are provided with notches 41a filling up said notches, ferrule metal fills such notches. The ferrule also expands radially inwardly to clamp the rung as shown.

It is to be noted that FIGURES 9 to 10 inclusive disclose the preforming of the ferrule by coining a standard straight ferrule such as that shown at 15′ in a die 16′, the die being similarly formed to the die 16, having a stepped end cavity 17′, a pilot pin 18′. The pilot pin 18′ or mandrel enters the bore of the ferrule, then the solid die member 28″ having the stepped end cavity 29′ with the contour preferred for the flange to be formed on an end of the ferrule, surrounds the outer end of the ferrule and applies pressure causing the ferrule metal to flow into said cavity 29′. The flange 43 is thus formed on the ferrule; the ferrule so formed can then be used for assembly with the rung and rail according to the disclosure of FIGURES 1 to 8 inclusive and the disclosure of FIGURE 12. On the upstroke of the press, the pilot pin strips the thus formed ferrule from the die 28′ and thereafter conventional stripper-type mechanisms may be employed to strip the same from the punch and pilot means.

In FIGURE 12 is shown a horizontal punch press 100 having a stem 122 adapted to be clamped to the ram of the press; said stem being secured to a top die shoe 126 having a cam member 104 secured at one end adapted to act on a cam 101 at an end of a horizontally disposed movable solid die member 99; the said solid die member 99 is formed similarly to the solid die member 16 in the punch press form of FIGURES 1–3A inclusive, a pilot pin 98 projecting forwardly thereof, an end cavity 170 provided therein, spring-loaded guide pins 108 carried thereby; a split die member 124 is adapted to be disposed in spaced relation thereto, the lower half 141b of the split die being secured to a bottom die shoe 140 and the upper portion 141a being secured to spring-tensioned guide rods 128; the helical spring means 132 being adapted to exert pressure on the upper half 141a of the split die in operation to cause the split die 124 to close and engage the rung 134 before the cam 104 reaches its lowermost position in which the solid die 99 is caused to move toward a rung, ferrule and rail assembly gripped by the split die 124.

The ferrule 135 in this form of the invention is shown overhanging an end of a rung 134, as in the form of FIGURES 1 to 3A inclusive, and in such modification there will be no movement of the rung 134 during swedging by the movable die means. It will be noted that in the form shown, the pilot pin is spring-loaded by means of a spring 150, said spring being secured at one end to a movable die mounting 151 and at its other end to a support 152 secured to the press bed 140.

It is to be noted that the pilot pin 98, similarly to the pilot pin 18, is of a diameter which is slightly smaller than the inner diameter of the rung and that it moves forward on a down-stroke of the ram and, on upstroke of the ram, the spring 150 returns the pilot pin and solid die member to the position shown in solid lines in FIGURE 12. Should the ferrule be placed on the rung so that its unflanged end portion is flush with the end of the rung, then the rung will have to be shifted away from the solid die 99 during swedging. In the case where a pair of dies are used to simultaneously form both ends of a rung, the dies should preferably float away from the ends of the rung or else overhung ferrules be used.

In the form of the invention illustrated in FIGURE 12, the split dies 124 are shown as remaining stationary during swedging and the solid die is movable. It will be understood, however, that the split dies gripping the rung, ferrule and rail assembly may be caused to move and the solid die remain stationary, or both the solid and split dies could be caused to move simultaneously. In operation, as shown in FIGURE 12, the ferrule, rung and rail assembly, the rail facing oppositely to the assembly of FIGURE 6, is placed in the bottom half 141b of the split die 124 while the top part of the split die 141a is held spaced upwardly thereof. The ram is then caused to move downwardly causing the upper die portion 141a to close about the rung 134; during this operation, the side rail 142 is disposed forwardly of the edge of the split die having an end cavity therein. After the rung, ferrule and side rail assembly is surrounded and gripped by the two parts of the split die 124, a ferrule, rung and side rail assembly in the phantom position shown in FIGURE 12 is moved back or to the right, as shown in FIGURE 12 in solid lines, and the die surrounds the annulus 143 of the preformed ferrule 135; the spring-loaded guide pins 108 act on the side rail to maintain the same perpendicular to the axis of the rung 134; the pilot pin 98 is then caused to enter the inside bore of the rung 134 and aligned portions of the end cavity 170 of the solid die 99 engage the edge 152 of the ferrule 135 applying compressive force thereto to cause the metal to flow radially outwardly into compression engagement within and in a side-rimming flow along the side of the rail 142 facing the die 99 and surrounding the opening in the rail through which the said portion of the ferrule projects. As pressure is applied, there will be relative movement between the rung and the side rail and ferrule. The pilot pin is adapted to control the inward collapse of the rung and ferrule as described in connection with the embodiment of FIGURES 1 to 8 inclusive, and the movement of the ferrule metal is as heretofore described.

On the upstroke of the press, after the cams 101, 102 are disengaged, the tension spring 150 strips the solid die 99 and pilot pin 98 from the swaged assembly. During this interval, the compressed springs 132 hold the top die member 141a of the split die 124 in engagement with the rung and maintains the assembly in its initial clamped position. The compression springs 132 are thus adapted to hold the upper die member stationary even during movement of the ram and the top die shoe upwardly for a certain distance to retain the rail assembly therein until it is desired to mechanically or manually strip the assembly therefrom.

In FIGURES 13 to 17, an alternate arrangement to that illustrated in FIGURES 9 to 11 for preforming a ferrule 210 directly on the rung 234 is shown. In this approach, a solid die 218 carrying a specially formed spring-loaded pilot pin is employed; the pin shown is a floating pin having a swaged end or nose portion 232, an annular part 232a adjacent thereto, a stepped shoulder 214′ and stem portion 216 having an enlarged flange 222 thereon. The stem portion 216 is adapted to be disposed in a bore 216a in the solid die member 218 and the enlarged flange, or head, 222 of the pilot pin is of greater diameter than the inner diameter of the bore 216a. Said head 222 is seated in an enlaregd rearwardly disposed bore 220 in the die member 218 and is movable between fixed stops 226 and 228. A coil spring 224 is seated in a recess 229 in a rear wall 228 of the die member 218 and an opposite end of the coil abuts the head 222 of the pilot pin.

Figures 13, 14:
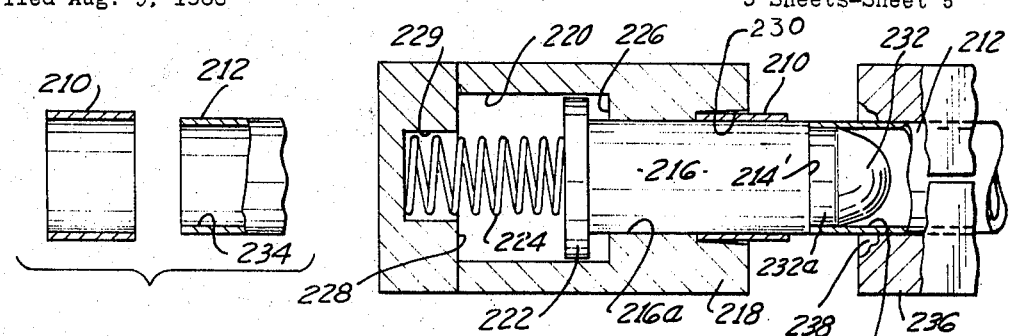
Figure 15:
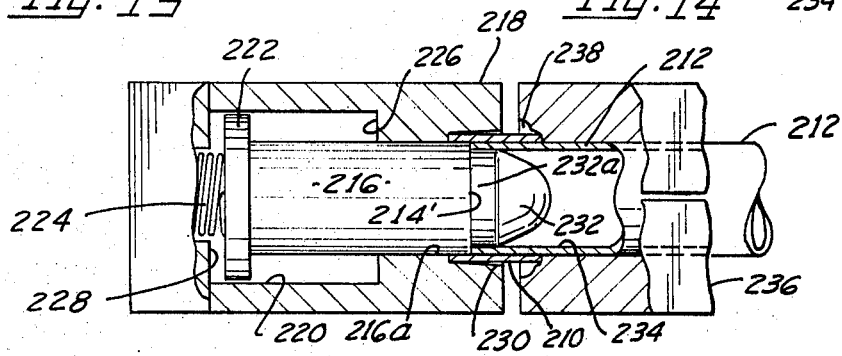
Figure 16:
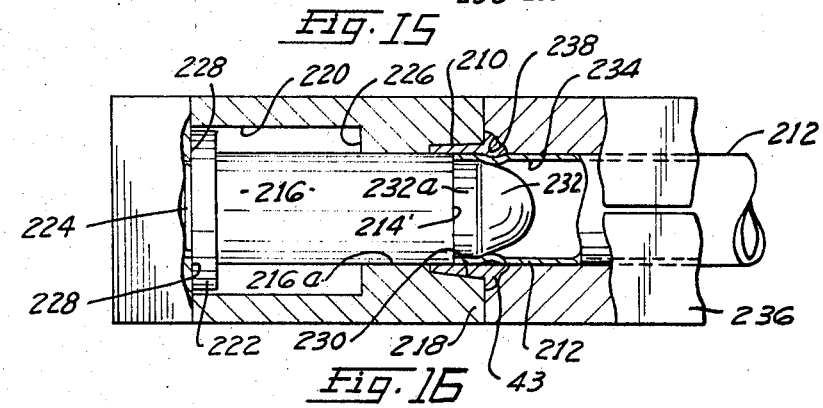

A standard ferrule shown at 210 is telescoped over a portion of the stem 216 and is carried in a central opening 230 adjacent the forward end of the solid die member 218. In operation, the ferrule is first placed within the tapered opening 230 in the die member 218 and over the stem 216 of the pilot pin. The die member is then moved forwardly from the position shown in FIGURE 14 toward a split die member 236 which grips a rung 212 therein and said ferrule is adapted to be, as shown in FIGURE 15, provided with a portion which is telescoped over an end of the rung 212 which projects outwardly of the split die member, as best shown in FIGURE 14. Continued movement of the die and pilot pin into the bore 234 of the rung causes the ferrule to be advanced to bottom on the end cavity 238 and continued pressure by means of movement of the solid die causes the pin 222 to exert a swaging pressure upon the metal of the ferrule to expand the same radially outwardly into the end cavity causing a flange to be formed therein and at the same time an inward radial movement of the rung and ferrule metal produces a grooving as indicated at 260 and the pilot pin 232 similarly to that in the press of FIGURES 1 and 12 backs up such inward flow.

Figure 17:
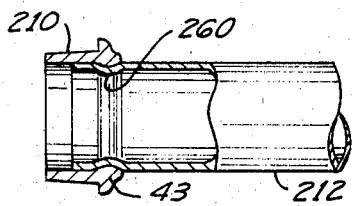

It will be noted that in the form shown, the pressure exerted by the spring 224 is added to the advancing movement of the solid die to add to the pressure exerted. More particularly, FIGURE 17 shows the radially inward collapse of both rung and ferrule, as well as the radially outward expansion of the ferrule metal to preform the flange on the ferrule.

While we have described our invention in connection with certain new and improved embodiments thereof, it will be readily understood that numerous and extensive departures may be made therefrom without, however, departing from the spirit of our invention or the scope of the appended claims.

What we claim is:

1. In making a secure stress and strain-resistant ladder joint between a rung part and a rail part, the steps of providing a hollow rung part with at least one end portion of substantially constant wall dimension lengthwise thereof, providing a rail part with a longitudinal side wall having at least one open portion therethrough of larger diameter than the one end portion of the rung part and defined by an enclosing peripheral edge wall, aligning the rung part substantially perpendicular to and with its one end portion in alignment with the open portion of the rail part, positioning a tubular metal ferrule having a radially outwardly extending preformed flange on one end with a portion of its inner wall over the one end portion of the rung part and with its outer wall within the enclosing peripheral edge wall of the rail part and said flange in abutment with peripheral wall surface portions of the rail part surrounding said opening, flowing metal of the other end of said ferrule part radially outwardly into tight engagement with opposite peripheral wall surface portions surrounding said opening and substantially simultaneously flowing metal of the ferrule part into tight engagement with the one end portion of the rung part and radially inwardly into and deforming an annular latching valley in the one end portion in the plane of said side wall to provide a secure and shock-resistant joint between the rail part and the rung part.

2. In making a secure stress and strain-resistant ladder joint between a rung part and a rail part as defined in claim 1 wherein the said preformed flange of the ferrule provides reinforcing support for the opposite end of the ferrule during compression thereof.

3. In making a secure stress and strain-resistant ladder joint between a rung part and a rail part as defined in claim 2 wherein the compression and flow of the metal of the ferrule part is effected and controlled by endwise movement of a die comprising a flange forming cavity and having means associated therewith adapted to be projected during said endwise movement within the hollow rung end portion and back up the said outer end portion of the said rung during said compression and flow of the ferrule metal.

4. In making a secure stress and strain-resistant ladder joint between a rung part and a rail part as defined in claim 3 wherein the rung and ferrule parts are gripped by split die members during compression and forming of the ferrule and rung parts.

5. In making a secure stress and strain-resistant ladder joint between a rung part and a rail part as defined in claim 4 wherein said split die members form an end cavity conforming in contour to the said ferrule flange and seat the same during the joint assembly.

6. In making a secure stress and strain-resistant ladder joint between a rung part and a rail part as defined in claim 3 wherein the metal ferrule has a portion thereof overhanging the one end portion of the rung part and the metal of the said overhanging portion is caused to flow into tight engagement with the said opposite peripheral wall surface portions and is formed into a flange surrounding one side of the opening by said die cavity.

7. In making a secure stress and strain-resistant ladder joint between a rung part and a rail part as defined in claim 1 wherein the metal ferrule is rigidly affixed to said hollow rung part prior to aligning the rung part in alignment with the opening portion of the rail part.

8. In making a secure stress and strain-resistant ladder joint between a rung part and a rail part, the steps of providing a hollow rung part with at least one end portion of substantially constant wall dimension lengthwise thereof, providing a rail part with a longitudinal side wall having at least one open portion therethrough of larger diameter than the one end portion of the rung part and defined by an enclosing peripheral edge wall, aligning the rung part substantially perpendicular to and with its one end portion in alignment with the open portion of the rail part, positioning a tubular metal ferrule having a radially outwardly extending preformed flange on one end with a portion of its inner wall over the one end portion of the rung part and with its outer wall within the enclosing peripheral edge wall of the rail part and said flange in abutment with peripheral wall surface portions of the rail part surrounding said opening, flowing metal of the other end of said ferrule part radially outwardly into tight engagement with opposite peripheral wall surface portions surrounding said opening and substantially simultaneously flowing metal of the ferrule part into tight engagement with the one end portion of the rung part and radially inwardly into and deforming an annular latching valley in the one end portion in the plane of said side wall to provide a secure and shock-resistant joint between the rail part and the rung part, the metal ferrule being rigidly affixed to said hollow rung part prior to aligning the rung part in alignment with the open portion of the rail part, the metal of the ferrule part being disposed in tight engagement with one end portion of the rung part and radially inwardly into an annular latching valley in the wall of the one end portion of the rung part prior to said rung and ferrule insertion into an opening in the rail part.

9. In making a secure stress and strain-resistant ladder joint between a rung part and an apertured rail part, the steps of providing a tubular metal ferrule having a preformed radial flange on one end telescoped over the rung, disposing the preformed flange against surface portions surrounding the rail aperture on one side of the rail and flowing the metal at the opposite end of the ferrule firmly against surface portions surrounding the aperture on the other side of the rail and simultaneously flowing metal of the ferrule radially inwardly and outwardly in the plane of the rail to cause compressive engagement at the inner periphery of the aperture and formation of an annular latching valley in the rung.

10. In making a secure stress and strain-resistant ladder joint as set forth in claim 9, the first mentioned step comprising mounting the ferrule on the rung in tight compressive engagement therewith.

11. In making a secure stress and strain-resistant ladder joint as set forth in claim 10, the first mentioned step comprising telescoping an unflanged ferrule over the rung and flowing the metal at said one end into a radial flange and into compressive engagement with said rung.

12. In making a secure stress and strain-resistant ladder joint as set forth in claim 11, the metal of said ferrule flowing into and deforming an annular latching valley in the rung.

13. In making a secure stress and strain-resistant ladder joint as set forth in claim 9, the first mentioned step comprising providing a nonflanged ferrule blank and flowing the metal adjacent to one end thereof into a radial flange, and telescoping the flanged ferrule blank over the rung.

References Cited

UNITED STATES PATENTS

| 2,667,688 | 2/1954 | Winter | 29—512 |
| 2,898,671 | 8/1959 | Heim. | |
| 3,039,186 | 6/1962 | Stoyer et al. | 29—523 X |
| 3,354,987 | 11/1967 | Werner et al. | 182—228 |

CHARLIE T. MOON, Primary Examiner

U.S. Cl. X.R.

29—520, 523; 182—228